(12) United States Patent
Porter et al.

(10) Patent No.: US 10,408,088 B2
(45) Date of Patent: Sep. 10, 2019

(54) MID-TURBINE FRAME STATOR WITH REPAIRABLE BUSHING AND RETENTION PIN

(71) Applicant: United Technologies Corporation, Hartford, CT (US)

(72) Inventors: Steven D. Porter, Wethersfield, CT (US); John T. Ols, Northborough, MA (US)

(73) Assignee: United Technologies Corporation, Farmington, CT (US)

( * ) Notice: Subject to any disclaimer, the term of this patent is extended or adjusted under 35 U.S.C. 154(b) by 803 days.

(21) Appl. No.: 14/853,530

(22) Filed: Sep. 14, 2015

(65) Prior Publication Data

US 2016/0201514 A1 Jul. 14, 2016

Related U.S. Application Data

(60) Provisional application No. 62/092,641, filed on Dec. 16, 2014.

(51) Int. Cl.
| | |
|---|---|
| *F01D 25/24* | (2006.01) |
| *F01D 9/04* | (2006.01) |
| *B23P 6/00* | (2006.01) |

(52) U.S. Cl.
CPC .......... *F01D 25/246* (2013.01); *B23P 6/002* (2013.01); *F01D 9/041* (2013.01); *F05D 2230/30* (2013.01); *F05D 2230/60* (2013.01); *F05D 2230/64* (2013.01); *F05D 2230/70* (2013.01); *F05D 2230/80* (2013.01); *Y10T 29/49318* (2015.01); *Y10T 29/49872* (2015.01)

(58) Field of Classification Search
CPC ........ F01D 25/246; F01D 9/041; F01D 25/28; F05D 2230/80; F05D 2230/60; F05D 2230/64; F05D 2230/70; F05D 2260/30; B23P 6/002; Y10T 29/49872; Y10T 29/49318
USPC ..... 415/173.1, 173.2, 189, 190, 209.2–209.4
See application file for complete search history.

(56) References Cited

U.S. PATENT DOCUMENTS

| | | | | |
|---|---|---|---|---|
| 2,427,244 A | * | 9/1947 | Warner | F01D 5/082 415/115 |
| 3,751,180 A | * | 8/1973 | Cameron | F01D 9/041 415/195 |
| 5,224,825 A | * | 7/1993 | Strang | F01D 25/246 415/135 |

(Continued)

FOREIGN PATENT DOCUMENTS

WO 2014/189579 11/2014

*Primary Examiner* — Christopher Verdier
(74) *Attorney, Agent, or Firm* — Snell & Wilmer, L.L.P.

(57) ABSTRACT

A gas-turbine engine is provided comprising a high-pressure turbine, a low-pressure turbine aft of the high-pressure turbine, and a housing around the low-pressure turbine and the high-pressure turbine. A stator may be disposed between the low-pressure turbine and the high-pressure turbine with a boss formed on the stator. A bushing may be retained in the boss with a pin coupled to the housing and partially within the bushing. A method of mounting a full-ring stator is also provided, the method including the steps of inserting a bushing into a boss of the full-ring stator by press fitting, and inserting a pin into the bushing of the full-ring stator.

18 Claims, 5 Drawing Sheets

(56) References Cited

U.S. PATENT DOCUMENTS

| | | | | |
|---|---|---|---|---|
| 5,634,767 A | * | 6/1997 | Dawson | F01D 25/246 |
| | | | | 415/134 |
| 2008/0193280 A1 | * | 8/2008 | Addis | B23P 6/005 |
| | | | | 415/148 |
| 2010/0132371 A1 | * | 6/2010 | Durocher | F01D 9/065 |
| | | | | 60/796 |
| 2013/0259646 A1 | * | 10/2013 | Feindel | F01D 21/003 |
| | | | | 415/118 |
| 2015/0260057 A1 | * | 9/2015 | Farah | F01D 25/24 |
| | | | | 60/796 |
| 2016/0032778 A1 | * | 2/2016 | Sanchez | F02C 7/20 |
| | | | | 60/751 |
| 2016/0123166 A1 | * | 5/2016 | Ols | F01D 5/143 |
| | | | | 415/210.1 |
| 2016/0153297 A1 | * | 6/2016 | Olds | F01D 9/041 |
| | | | | 60/722 |
| 2016/0169032 A1 | * | 6/2016 | Porter | F01D 21/003 |
| | | | | 415/118 |

* cited by examiner

MID-TURBINE FRAME STATOR WITH REPAIRABLE BUSHING AND RETENTION PIN

CROSS-REFERENCE TO RELATED APPLICATIONS

This application is a nonprovisional of, and claims priority to, and the benefit of U.S. Provisional Application No. 62/092,641, entitled "MID-TURBINE FRAME STATOR WITH REPAIRABLE BUSHING AND RETENTION PIN," filed on Dec. 16, 2014, which is hereby incorporated by reference in its entirety.

FIELD OF INVENTION

The present disclosure relates to gas turbine engines, and, more specifically, to a repairable bushing for a mid-turbine frame stator.

BACKGROUND

In gas turbine engines, vanes may be stationary airfoils placed between rotating airfoils and coupled to a stator. For example, a mid-turbine frame stator may be disposed between a high-pressure turbine and low-pressure turbine. The stator may be subject to high temperatures and stresses. Additionally, the stator may expand or contract slightly with thermal expansion or be subject to engine vibration. As a result, fasteners coupling the stator to a casing may wear and require replacement. Replacement or repair may be carried out by way of extensive disassembly of or removal of the gas turbine engine from an aircraft.

SUMMARY

A gas-turbine engine is provided comprising a high-pressure turbine, a low-pressure turbine aft of the high-pressure turbine, and a housing around the low-pressure turbine and the high-pressure turbine. A stator may be disposed between the low-pressure turbine and the high-pressure turbine with a boss formed on the stator. A bushing may be retained in the boss with a pin coupled to the housing and partially within the bushing.

In various embodiments, the bushing may be press fit within the boss. The stator may be a full-ring stator and may comprise a plurality of bosses. A plurality of pins may be coupled to the housing and partially within the plurality of bosses. The pin may have an engagement length with the bushing of 0.5 to 1.5 times a diameter of the bushing. The bushing may have an inner diameter 0.1 to 0.3 times an outer diameter of the stator divided by a number of bushings used to support the stator.

A mid-turbine frame is also provided and comprises a full-ring stator, a housing around the full-ring stator, a boss disposed on the full-ring stator, and a pin disposed partially in the boss. The pin may be configured to fix the full-ring stator relative to the housing.

In various embodiments, a bushing may be at least partially in the boss. The pin may be retained partially in the bushing. The bushing may be press fit into the boss. The pin may have an engagement length with the bushing of 0.5 to 1.5 times a diameter of the bushing. The bushing may have an inner diameter 0.1 to 0.3 times an outer diameter of the full-ring stator divided by a number of pins used to support the full-ring stator. The bushing may comprise a cobalt alloy. The pin may be a nickel-cobalt alloy. The full-ring stator may have more airfoils than bosses.

A method of mounting a full-ring stator is further provided and comprises the steps of inserting a bushing into a boss of the full-ring stator by press fitting, and inserting a pin into the bushing of the full-ring stator. In various embodiments, the method may also include the step of re-boring the boss of the full-ring stator. A second bushing may be inserted into the boss. The method may also include removing the pin from the bushing, and inserting a second pin into the bushing.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
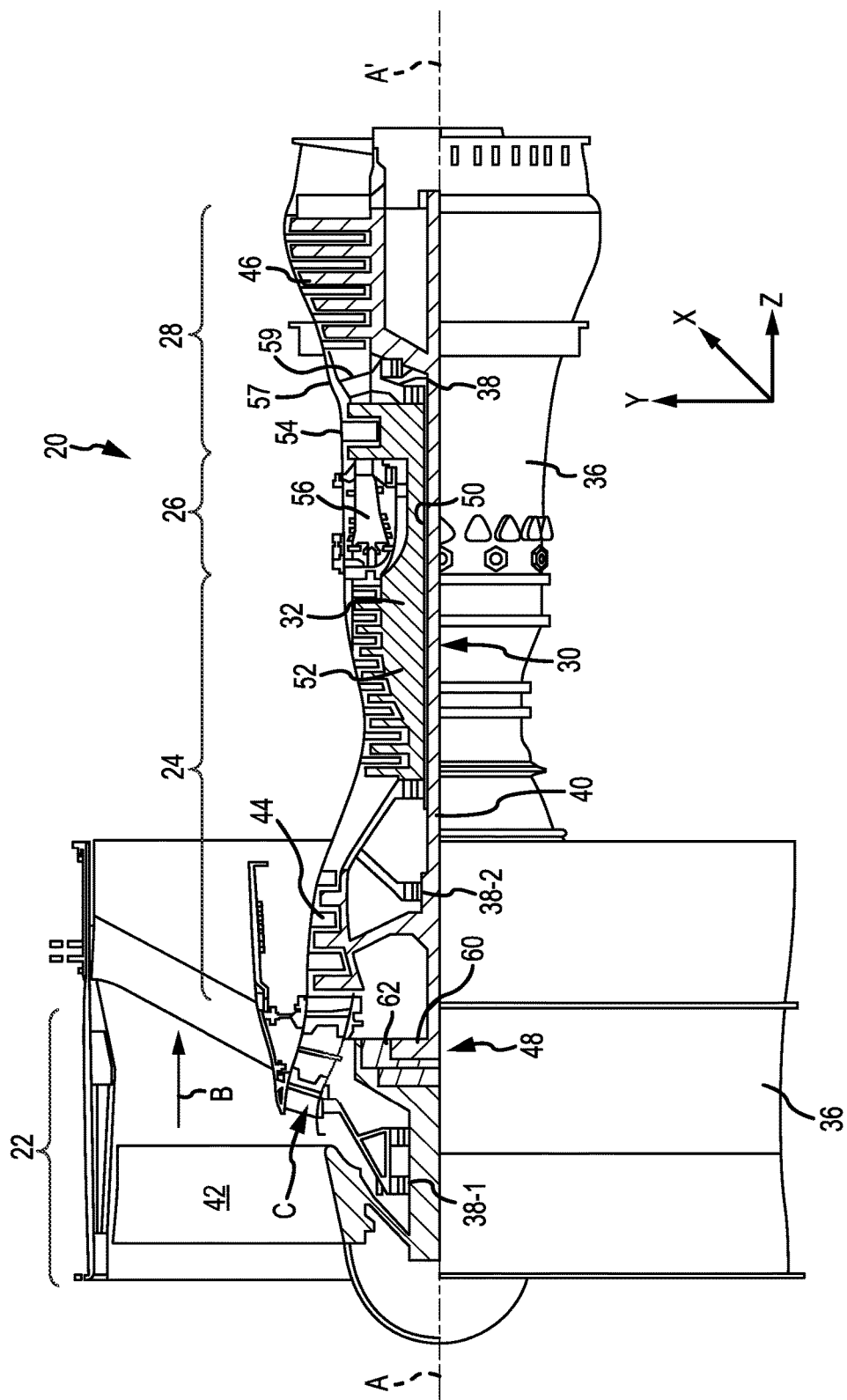
FIG. 1 illustrates an exemplary embodiment of a gas-turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high-pressure compressor 52 and high-pressure turbine 54. A combustor 56 may be located between high-pressure compressor 52 and high-pressure turbine 54. A mid-turbine frame 57 of engine static structure 36 may be located generally between high-pressure turbine 54 and low-pressure turbine 46. As used herein, "mid-turbine frame" refers to a non-rotating or static structure between the high-pressure turbine 54 and low-pressure turbine 46. In three-spool engines having an intermediate turbine, a mid-turbine frame may be located between any of the high-pressure turbine, the low-pressure turbine, and/or the intermediate turbine. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow C may be compressed by low-pressure compressor 44 then high-pressure compressor 52, mixed and burned with fuel in combustor 56, then expanded over high-pressure turbine 54 and low-pressure turbine 46. Mid-turbine frame 57 includes airfoils 59, which are in the core airflow path. Airfoils 59 may be formed integrally into a full-ring, mid-turbine-frame stator and retained by a retention pin. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low-pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low-pressure compressor 44. Low-pressure turbine 46 pressure ratio may be measured prior to inlet of low-pressure turbine 46 as related to the pressure at the outlet of low-pressure turbine 46 prior to an exhaust nozzle. It should be understood, however, that the above parameters are exemplary of various embodiments of a suitable geared architecture engine and that the present disclosure contemplates other turbine engines including direct drive turbofans.

Figure 2:
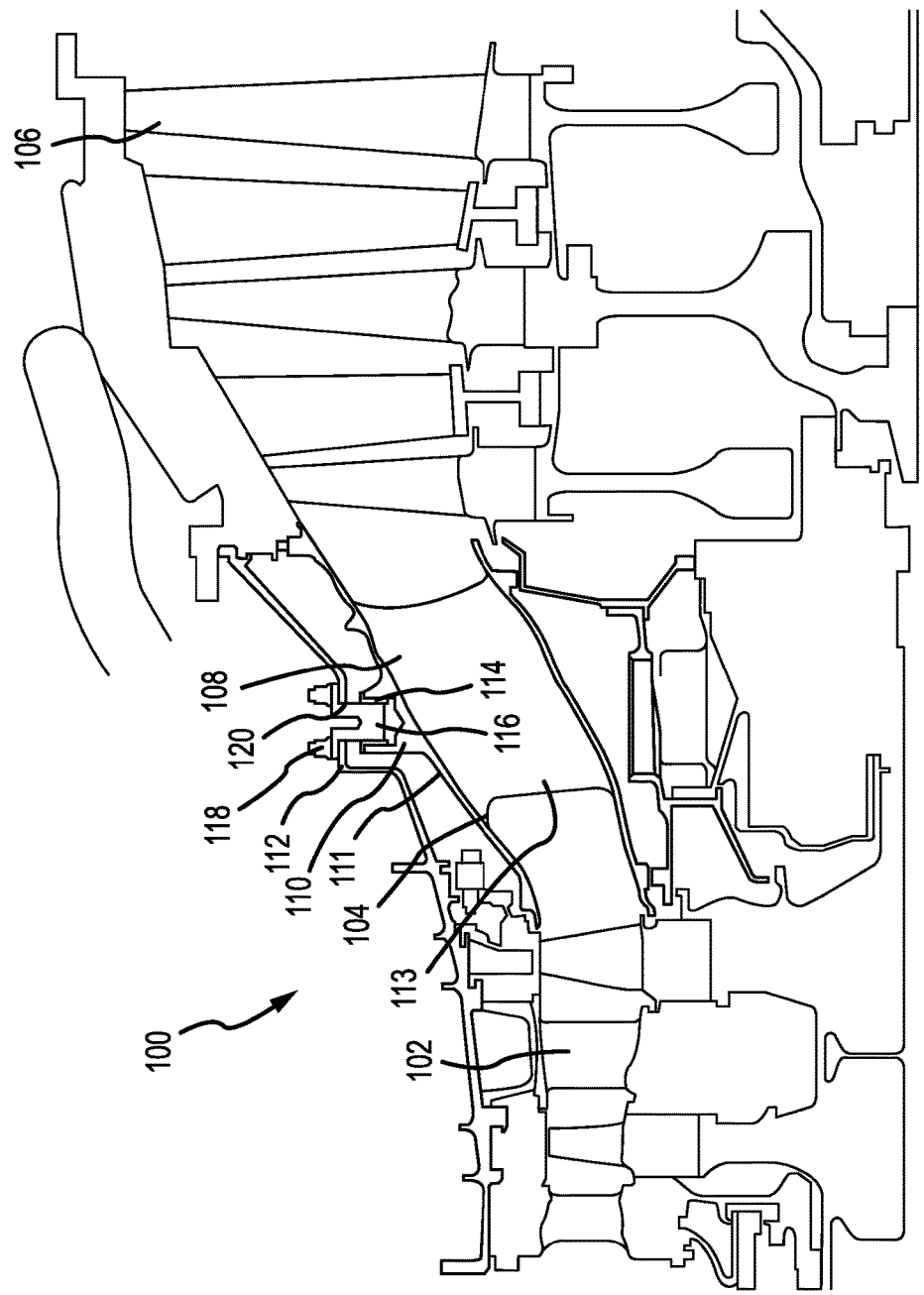
FIG. 2 illustrates a mid-turbine frame of a gas-turbine engine, in accordance with various embodiments.

With reference to FIG. 2, a gas-turbine engine 100 comprising a mid-turbine frame 104 with a stator 108 retained by a pin 116 and a bushing 114 is shown, in accordance with various embodiments. Mid-turbine frame 104 is aft of high-pressure turbine 102 and forward of low-pressure turbine 106. Mid-turbine frame 104 comprises stator 108 with boss 110 integrally formed on an outer surface 111 of stator 108. Stator 108 may comprise airfoil 113 extending in a substantially radial direction. Housing 112 may enclose low-pressure turbine 106, stator 108, and high-pressure turbine 102. Housing 112 may include an opening 120 aligned with boss 110 of stator 108. Pin 116 may extend through opening 120 and into boss 110 of stator 108. In various embodiments, bushing 114 may be press-fit into boss 110. Bushing 114 may be configured to receive pin 116. Pin 116 may be fixed in opening 120 of housing 112 by fasteners 118 (e.g., rivets).

Figure 3A:
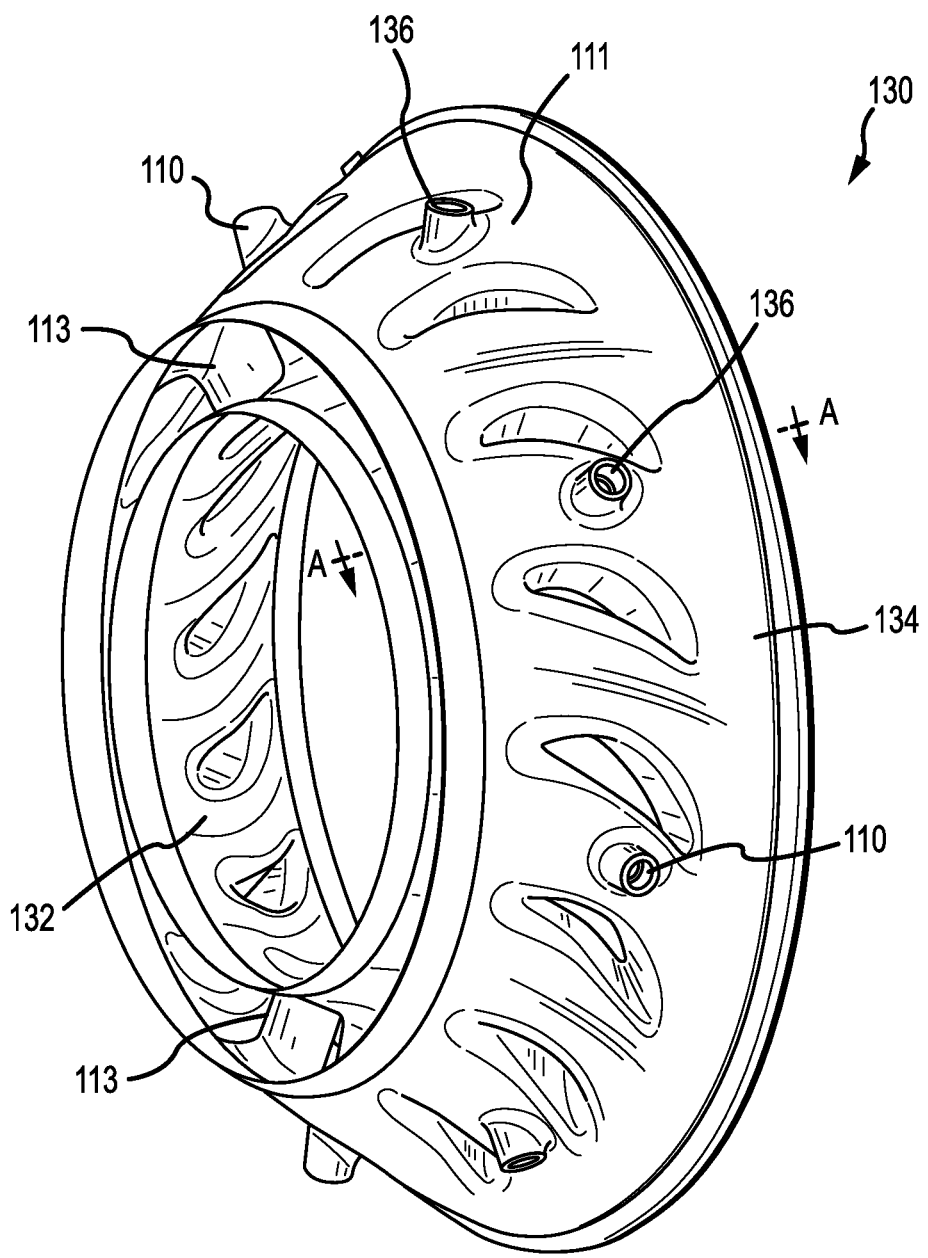
FIG. 3A illustrates a perspective view of a mid-turbine frame stator having bosses to receive a pin and/or bushing, in accordance with various embodiments.
Figure 3B:
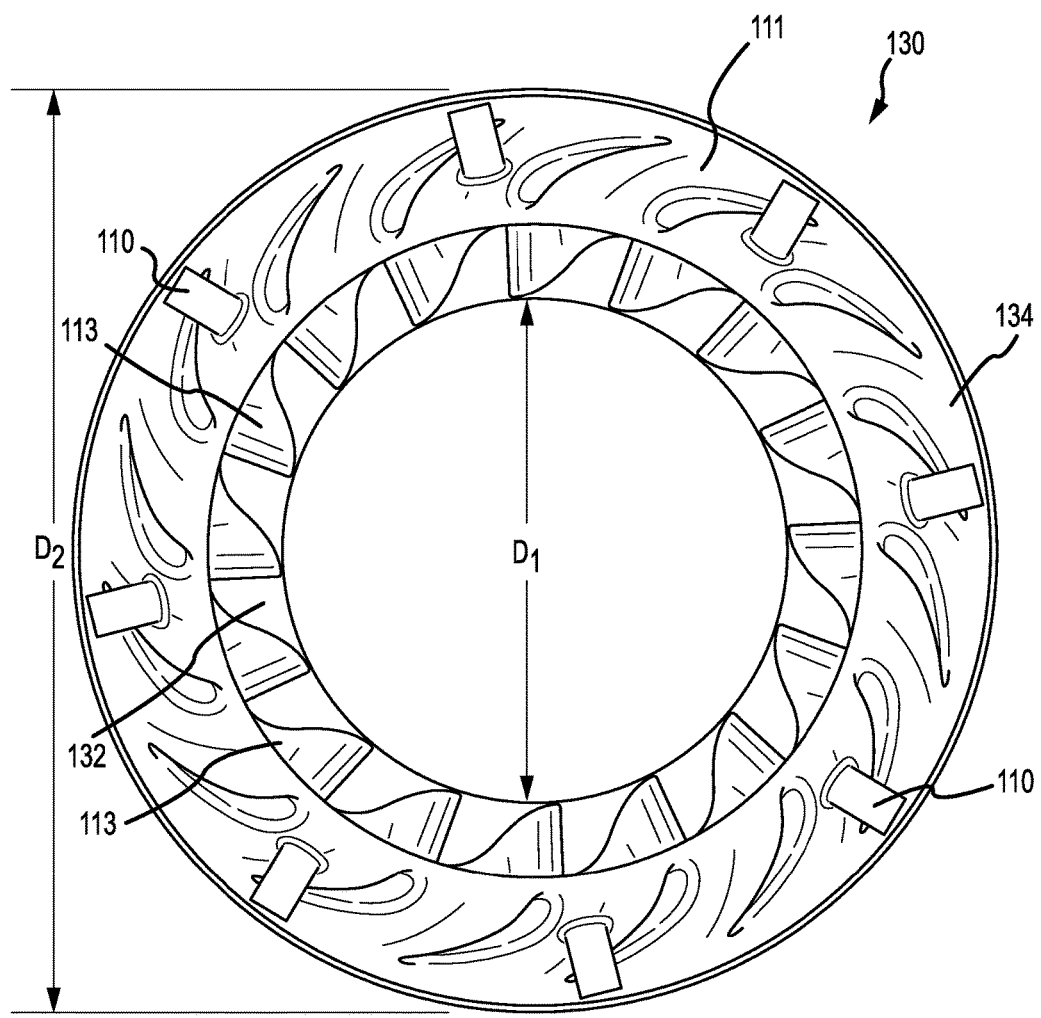
FIG. 3B illustrates an elevation view of a mid-turbine frame stator having bosses to receive a pin and/or bushing, in accordance with various embodiments.

With reference to FIGS. 3A and 3B, a full-ring stator 130 is shown having bosses 110 disposed in outer surface 111 around an outer annulus 134 of the stator, in accordance with various embodiments. Full-ring stator 130 may have an annular geometry. An inner annulus 132 may be disposed radially inward from an outer annulus 134. Airfoils 113 may connect inner annulus 132 with outer annulus 134. Bosses 110 may be spaced evenly around outer annulus 134 of full-ring stator 130. Bosses 110 may have walls with a thickness to allow re-boring in the event a boss requires repair. The thickness of the boss may be reduced by the re-boring as the diameter of inner surface 136 of boss 110 is increased. In various embodiments, bosses may be numbered so that full-ring stator 130 has one boss 110 for every two airfoils 113.

In various embodiments, full-ring stator 130 may have an inner diameter D1 and an outer diameter D2. Outer diameter D2 may be the largest diameter of outer annulus 134 of full-ring stator 130. Inner diameter D1 may be the smallest diameter of inner annulus 132 of full-ring stator 130. Full-ring stator 130 and bosses 110 may be made from a high-performance nickel and/or cobalt based superalloy (e.g., the alloy available under the trademark MAR-M-247).

Figure 4:
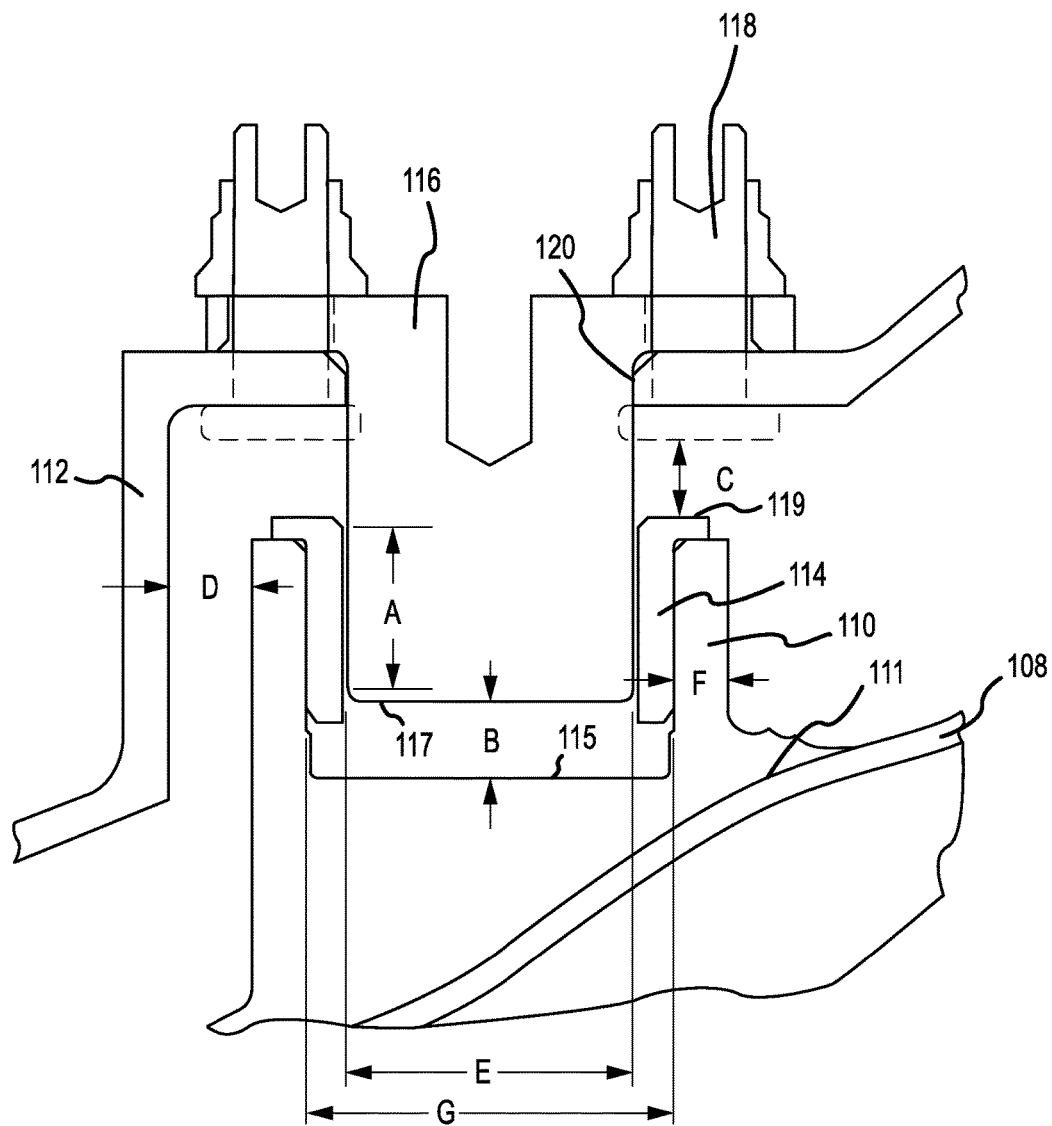
FIG. 4 illustrates a bushing and pin inserted into a stator boss, in accordance with various embodiments.

With reference to FIG. 4, a partial cross section along line A of FIG. 3A is shown with boss 110 having bushing 114 and pin 116 inserted in the stator boss, in accordance with various embodiments. Fastener 118 may be radially aligned with bushing 114. Bushing 114 may be in contact with pin 116 along engagement length A. Engagement length A is the length of contact between pin 116 and bushing 114. A gap having distance B may extend between the end 117 of pin 116 and inner surface 115 of boss 110. A space of distance D extends between housing 112 and boss 110 of full-ring stator 130 to allow for position changes of full-ring stator 130 ancillary to use of the engine or wear over the life of the engine. A distance C between bushing surface 119 and fastener 118. Bushing 114 may also have diameter E of the internal bore of bushing 114.

In various embodiments, engagement length A may have a proportional relationship with diameter E of the internal bore of bushing 114. Engagement length A may be 0.5 to 1.5 times diameter E. For example, diameter E may be 0.78 inches (2 cm) while the engagement length A is 0.39 inches to 1.17 inches (1 cm to 3 cm). In another example, diameter E may be 0.53 inches (1.3 cm) while engagement length A is 0.265 inches to 0.795 inches (0.67 cm to 2 cm). Engagement length A may be selected within the above range of 0.5 to 1.5 times diameter E and may have favorable contact stress characteristics. Distance C may also be less than engagement length A at each boss 110 so that in the event full-ring stator 130 shifts over the life of the engine, pin 116 remains partially retained in bushing 114 and/or boss 110.

In various embodiments, bushing 114 and pin 116 may be made from metallic materials selected to exhibit favorable wear characteristics. For example, bushing 114 may be made from a cobalt-chromium alloy having favorable wear characteristics (e.g., one of the alloys available under the trademark STELLITE). Pin 116 may also be made from high-performance austenitic nickel and/or cobalt based alloy (e.g., the alloy available under the trademark WASPALOY). Bushing 114 may be made, for example, by the machining process known as turning.

In various embodiments, outer diameter D2 may have a relationship with the diameter E of bushing 114. Diameter E of bushing 114 may be between 0.1 and 0.3 times the outer diameter D2 of full-ring stator 130 divided by the number of bushings used. For example, diameter E of bushing 114 may be between 0.375 inches and 1.125 inches when the outer diameter D2 of full-ring stator 130 is 30 inches and 8 bushings are used (0.375=0.1*30/8 and 1.125=0.3*30/8). Thus, diameter E of bushing 114 may be enlarged in response to fewer bushings and/or pins being used to retain full-ring stator 130. The relationship may tend to provide favorable stress conditions along engagement length A between bushing 114 and pin 116.

In various embodiments, a thickness F of boss 110 on full-ring stator 130 may include extra material such that boss 110 may be bored out and still have sufficient material to withstand stress loads along engagement length A. In the event boss 110 is defective or benefits from repair, diameter G of boss 110 may be enlarged by boring out boss 110. The enlarged diameter after re-boring may be configured to retain a larger bushing 114 and/or pin 116 while having fewer defects and/or less deterioration after the re-boring process. A new bushing 114 may be press fit into the re-bored diameter of boss 110. Full-ring stator 130 may be stable with two or more pins 116 retained within bushings 114 and/or bosses 110. Full-ring stator 130 with bosses 110 may thus enable repair or replacement of boss 110, bushing 114, and or pin 116 with full-ring stator 130. For example, if eight pins 116 are used to retain full-ring stator 130, then 6 pins 116 may be removed while leaving full-ring stator 130 stable to allow for replacement of bushings 114 and/or pins 116 on wing.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas-turbine engine, comprising:
   a high-pressure turbine;
   a low-pressure turbine aft of the high-pressure turbine;
   a housing around the low-pressure turbine and the high-pressure turbine;
   a stator between the low-pressure turbine and the high-pressure turbine;

a boss formed on the stator;
a bushing retained in the boss having a bushing surface;
a pin coupled to the housing and partially within the bushing; and
a fastener disposed on the pin, the fastener being radially aligned with the bushing and configured to fix the pin to the housing, wherein a distance between the bushing surface and the fastener is less than an engagement length of the bushing, the distance being measured perpendicular to the bushing surface and the fastener.

2. The gas-turbine engine of claim 1, wherein the bushing is press fit within the boss.

3. The gas-turbine engine of claim 1, wherein the stator is a full-ring stator.

4. The gas-turbine engine of claim 3, wherein the stator comprises a plurality of bosses.

5. The gas-turbine engine of claim 4, further comprising a plurality of pins coupled to the housing and partially within the plurality of bosses.

6. The gas-turbine engine of claim 1, wherein the engagement length with the bushing is 0.5 to 1.5 times a diameter of the bushing.

7. The gas-turbine engine of claim 1, wherein the bushing has an inner diameter from 0.1 to 0.3 times an outer diameter of the stator divided by a number of bushings supporting the stator.

8. The gas-turbine engine of claim 1, wherein the boss is configured to be bored out to a second inner diameter through the housing, the second inner diameter being greater than a first inner diameter corresponding to the bushing.

9. A mid-turbine frame, comprising:
a full-ring stator;
a housing around the full-ring stator;
a boss disposed on the full-ring stator;
a pin disposed partially in the boss and configured to fix the full-ring stator relative to the housing;
a bushing at least partially in the boss, the bushing having a bushing surface and a length of engagement with the pin; and
a fastener disposed on the pin, the fastener being radially aligned with the bushing and configured to fix the pin to the housing, wherein a distance between the bushing surface and the fastener is less than the engagement length, the distance being measured perpendicular to the bushing surface and the fastener.

10. The mid-turbine frame of claim 9, wherein the pin is retained partially in the bushing.

11. The mid-turbine frame of claim 9, wherein the bushing is press fit into the boss.

12. The mid-turbine frame of claim 9, wherein the pin has the engagement length with the bushing of 0.5 to 1.5 times a diameter of the bushing.

13. The mid-turbine frame of claim 9, wherein the bushing has an inner diameter 0.1 to 0.3 times an outer diameter of the full-ring stator divided by a number of pins used to support the full-ring stator.

14. The mid-turbine frame of claim 9, wherein the bushing comprises a cobalt alloy.

15. The mid-turbine frame of claim 9, wherein the full-ring stator has more airfoils than bosses.

16. The mid-turbine frame of claim 9, wherein the boss is configured to be bored out to a second inner diameter through the housing, the second inner diameter being greater than a first inner diameter corresponding to the bushing.

17. A method of replacement, comprising:
removing a plurality of pins from a plurality of respective bushings of a full-ring stator, each respective bushing from the plurality of respective bushings corresponding to a respective boss from a plurality of bosses;
leaving at least two pins from the plurality of pins installed on a mid-turbine frame assembly while a mid-turbine frame is on a wing;
removing a bushing from the plurality of respective bushings from a boss from the plurality of bosses;
re-boring the boss of the full-ring stator at the location of the removed bushing; and
inserting a larger bushing into the re-bored boss.

18. The method of claim 17, further comprising inserting a larger pin in the larger bushing.

* * * * *